United States Patent
Rangarajan et al.

(10) Patent No.: US 7,349,408 B2
(45) Date of Patent: *Mar. 25, 2008

(54) METHOD AND APPARATUS FOR HANDLING OUT OF INVERSE MULTIPLEXING FOR ASYNCHRONOUS TRANSFER MODE FRAME ERROR CONDITIONS

(75) Inventors: Raja Rangarajan, Milpitas, CA (US); Manjunath T. Jagannatharao, San Jose, CA (US); Sajunair Madhavan Nair, San Jose, CA (US); Rajagopalan Kothandaraman, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 765 days.

This patent is subject to a terminal disclaimer.

(21) Appl. No.: 10/948,060

(22) Filed: Sep. 23, 2004

(65) Prior Publication Data

US 2005/0036503 A1     Feb. 17, 2005

Related U.S. Application Data

(63) Continuation of application No. 09/767,776, filed on Jan. 23, 2001, now Pat. No. 6,798,783.

(51) Int. Cl.
*H04L 12/28* (2006.01)

(52) U.S. Cl. .................. 370/395.51; 370/517; 370/535

(58) Field of Classification Search ...................... None
See application file for complete search history.

(56) References Cited

U.S. PATENT DOCUMENTS

| 5,168,356 A | 12/1992 | Acampora et al. |
| 5,359,602 A | 10/1994 | Diaz et al. |
| 5,617,417 A | 4/1997 | Sathe et al. |
| 5,875,192 A * | 2/1999 | Cam et al. ............... 370/395.7 |
| 5,970,067 A | 10/1999 | Sathe et al. |
| 6,205,142 B1 | 3/2001 | Vallee |
| 6,621,794 B1 * | 9/2003 | Heikkinen et al. .......... 370/235 |
| 6,680,954 B1 | 1/2004 | Cam et al. |
| 6,731,656 B1 | 5/2004 | Slater et al. |
| 6,798,783 B1 | 9/2004 | Rangarajan et al. |

OTHER PUBLICATIONS

Inverse Multiplexing for ATM (IMA) Specification Version 1.1, The ATM Forum Technical Committee, Mountain View, CA, Dec. 1999, 183 pages.

* cited by examiner

*Primary Examiner*—Chau Nguyen
*Assistant Examiner*—Dargaye H Churnet
(74) *Attorney, Agent, or Firm*—The Law Office of Kirk D. Williams (57) ABSTRACT

Methods and apparatus are disclosed for handling transient anomalies in a communications or computer device or system, such an inverse multiplexing for ATM ("IMA") device. Such transient anomalies may include out of IMA frame ("OIF") anomalies. In one implementation, cells comprising a stream of packets are received over multiple links along with indications of OIF conditions for these links. During a period of an inactive OIF condition on a link, cells are received over the link and placed in a buffer at a next location. After an OIF condition is detected, cells are ignored and a write process waits until the OIF condition is no longer active. At which point, a buffer position is determined to place the next valid cell. Typically, this cell should be placed in the same buffer position as it would have been if there had never been an active OIF condition.

15 Claims, 8 Drawing Sheets

BUFFER ENTRY

METHOD AND APPARATUS FOR HANDLING OUT OF INVERSE MULTIPLEXING FOR ASYNCHRONOUS TRANSFER MODE FRAME ERROR CONDITIONS

CROSS-REFERENCE TO RELATED APPLICATIONS

This is a continuation of application Ser. No. 09/767,776, filed Jan. 23, 2001, now U.S. Pat. No. 6,798,783 the complete disclosure of which is hereby incorporated by reference.

TECHNICAL FIELD

This invention relates to inverse multiplexing communications systems and devices, such as asynchronous transfer mode ("ATM") communications systems and devices; and more particularly, the invention relates to handling out of inverse multiplexing ATM ("IMA") frame error conditions.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology, particularly ATM switching technology.

Consumers and designers of these systems typically desire high reliability and increased performance at a reasonable price. A common technique for helping to achieve these goals is for these systems to provide multiple paths between a source and a destination. It is typically more cost-effective to provide multiple slower rate links or switching paths, than to provide a single higher rate path. Packets belonging to a packet stream are then distributed (e.g., multiplexed) among multiple paths at a source point. These distributed packets are transported across multiple links and then typically merged back into a single stream of packets at a destination point.

Figure 1A:
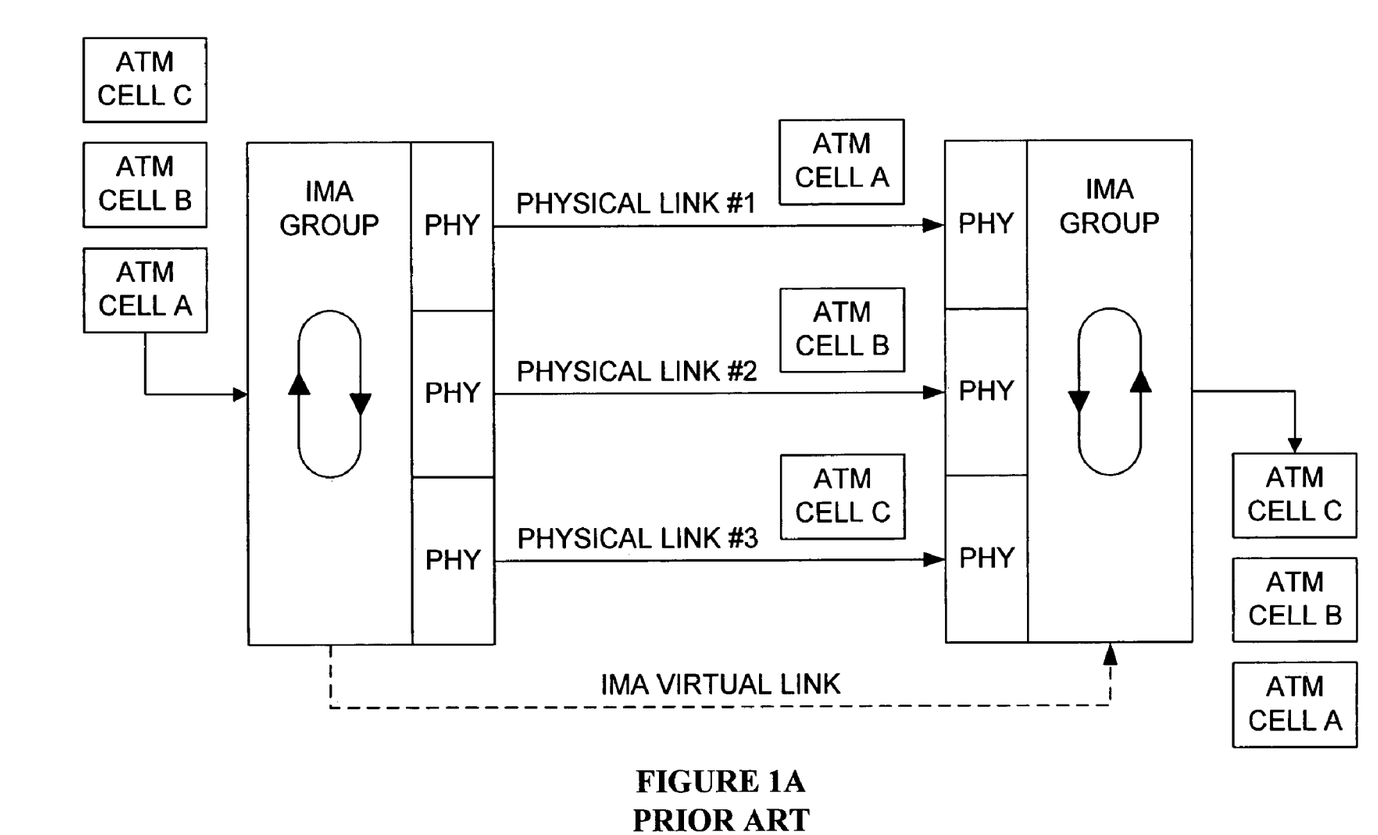
FIG. 1A is a block diagram for a prior art inverse multiplexing system.

One such mechanism for merging these packets into a packet stream is described in "Inverse Multiplexing for ATM (IMA) Specification Version 1.1," Document No. AF-PHY-0086.001 (Final Ballot—Draft #1), December 1998, hereafter referred to as the "IMA Specification." An example of such a technique extracted from the IMA Specification is illustrated in FIG. 1A, in which a stream of ATM cells is input into an IMA group device, distributed across three physical links, and merged back into a the original stream of ATM cells.

Figure 1B:
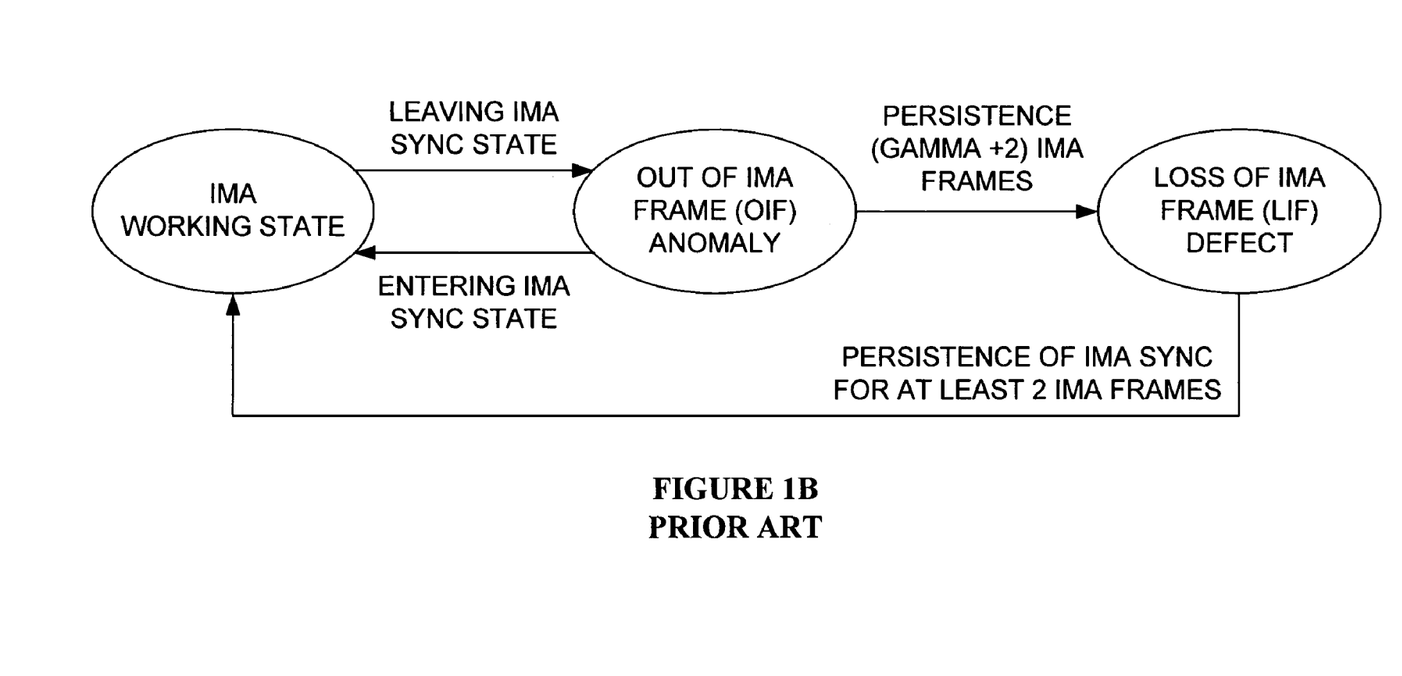
FIG. 1B is a block diagram for a prior art state machine for determining when a link is in an OIF anomaly condition.

As with most communications devices, there is always a potential for an error on a link or within some other component of the communications system. Once such transient error condition that may occur is an out of IMA frame ("OIF") anomaly. The IMA Specification provides a state diagram for when a particular link should transition between an IMA working state, an OIF anomaly, or a loss of IMA frame (LIF) defect state. This state diagram reproduced herein in FIG. 1B. The IMA Specification further provides that: (a) on a given link, the IMA receiver shall pass to the ATM layer from the IMA sub-layer any cells accumulated before the occurrence of an OIF anomaly on that link (R-117); (b) the IMA receiver shall pass from the IMA sub-layer to the ATM layer no cells received on a link during an OIF anomaly condition reported on that link (R-118); and (c) the IMA receiver shall replace with Filler cells all ATM layer cells received on a link after an OIF anomaly condition has been detected on that link (R-120). Needed are methods and systems for appropriately handling OIF anomalies.

SUMMARY

Methods and apparatus are disclosed for handling transient anomalies in a communications or computer device or system, such an inverse multiplexing for ATM ("IMA") device. Such transient anomalies may include out of IMA frame ("OIF") anomalies. In one implementation, cells comprising a stream of packets are received over multiple links along with indications of OIF conditions for these links. During a period of an inactive OIF condition on a link, cells are received over the link and placed in a buffer at a next location. After an OIF condition is detected, cells are ignored and a write process waits until the OIF condition is no longer active. At which point, a buffer position is determined to place the next valid cell.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Methods and apparatus are disclosed for handling OIF anomalies in a communications or computer device or system. Such methods and apparatus are not limited to a single computer or communications system. Rather, the architecture and functionality taught herein are extensible to an unlimited number of computer and communications systems, devices and embodiments in keeping with the scope and spirit of the invention. Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, integrated circuit chips, embedded processors, ASICs, methods, and computer-readable medium containing instructions. The embodiments described hereinafter embody various aspects and configurations within the scope and spirit of the invention.

Methods and apparatus are disclosed for handling transient anomalies in a communications or computer device or system, such as, but not limited to handling OIF anomalies in an ATM inverse multiplexing device. In one embodiment, cells comprising a stream of packets are received over multiple links along with indications of OIF conditions for these links. During a period of an inactive OIF condition on a link, cells are received over the link and placed in a buffer at a next location. After an OIF condition is detected, cells are ignored and a write process waits until the OIF condition is no longer active. At which point, a buffer position is determined to place the next valid cell. This cell should be placed in the same buffer position as it would have been if there had never been an active OIF condition. In this manner, cells will not become skewed between the multiple links. This cell position can readily be determined based on frame sequence numbers or other indicia. The number of buffer entry positions to skip is then placed in the buffer entry at the current location, and the buffer pointer is updated to the new buffer position for placement of received valid cells. As entries are removed from a buffer, if the buffer entry at the current buffer position does not contain a pointer jump value, the cell is extracted from the buffer entry and forwarded. Otherwise, a next buffer position is determined by incrementing the current buffer position by the pointer jump value number of entries and a jump flag is set. No cells are extracted from the buffer until the read pointer of the buffer reaches the determined next buffer position.

As used herein, the term "packet" or "cell" refers to packets of all types, including, but not limited to, fixed length cells and variable length packets, each of which may or may not be divisible into smaller packets or cells. Moreover, these packets may contain one or more types of information, including, but not limited to, voice, data, video, and audio information. Furthermore, the term "system" is used generically herein to describe any number of components, packet switch elements, packet switches, networks, computer and/or communication devices or mechanisms, or combinations thereof. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units.

Figure 2A:
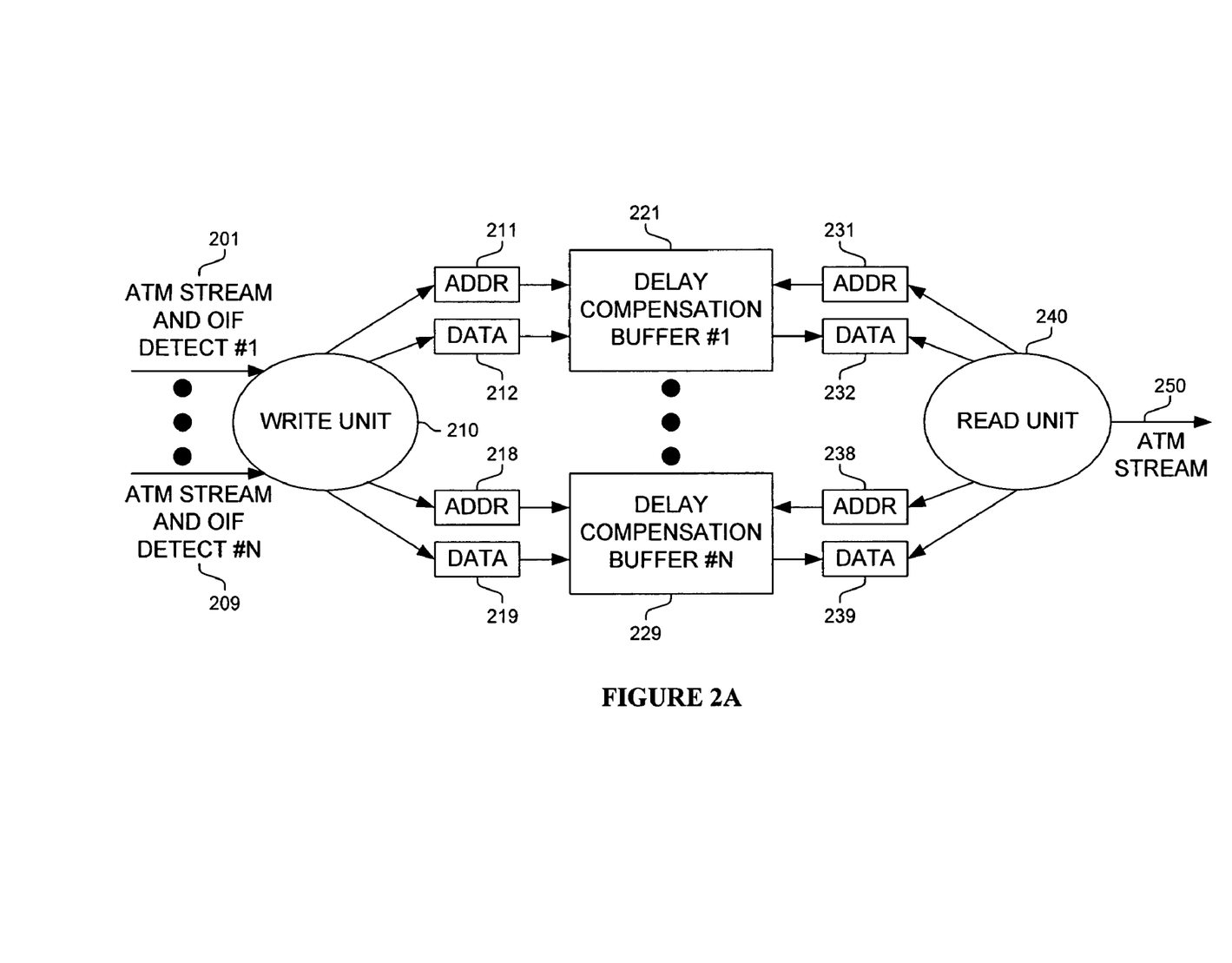
FIGS. 2A and 2B are block diagrams of embodiments for receiving a stream of cells distributed across multiple links, producing the original stream of cells, and handling OIF anomalies according to the invention.

FIG. 2A illustrates an inverse multiplexing system embodiment including a write unit 210, N delay compensation buffers 221-229 and a read unit 240. The inverse multiplexing system illustrated in FIG. 2A may be implemented and embodied in an unlimited number ways, including, but not limited to using specialized circuitry, ASICs, standard computing platforms, etc.

Cells and OIF detect indications or signals are received by write unit 210 over N links 201-209. Each of the N links 201-209 has a corresponding delay compensation buffer 221-229. In one embodiment, a single buffer (e.g., memory, data structure, etc.) is used for all N links 201-209. For each link 201-209, write unit 210 maintains a write pointer indicating a position within the corresponding delay compensation buffer 221-229 to write a next buffer entry. The value of the write pointer, or some derivative thereof, is used as an address 211 or 218, with the buffer entry used as the data 212 or 219 to be stored in the corresponding delay compensation buffer 221-229. In one embodiment, the buffer entry includes a received cell, an indication of the OIF state of the link 201-209 over which the particular cell was received, and possibly a new value indicating a range of buffer entries which may be skipped when reading cells from the corresponding delay compensation buffer 221-229.

Read unit 240 reads buffer entries from the delay compensation buffers 221-229 in a predetermined order (typically based on the distribution scheme of the original stream of cells). Read unit 240 supplies an address 231 or 238 to receive a buffer entry in data location 232 or 239 from one of the delay compensation buffers 221-229. Read unit 240 extracts the cells from the read buffer entries corresponding to inactive OIF conditions, and forwards the cells in the predetermined order to generate the original stream of cells 250 (excluding any cells that are not forwarded because of a corresponding OIF condition). The processing of one embodiment of the apparatus illustrated in FIG. 2A is further described herein in relation to FIGS. 3A-B, 4 and 5.

Figure 2B:
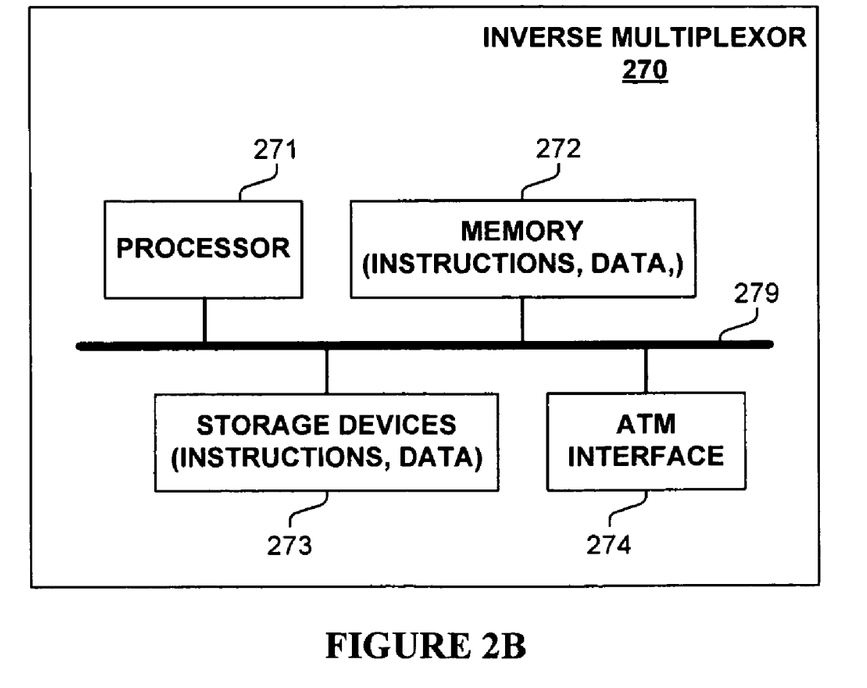

Additionally, FIG. 2B illustrates one of an unlimited number of embodiments for implementing the functionality described in relation to FIGS. 2A, 3A-B, 4 and/or 5. As shown in FIG. 2B, inverse multiplexer 270 comprises a processor 271, memory 272, storage devices 273, and an ATM interface 274, which are electrically coupled via one or more communications mechanisms 279 (shown as a bus for illustrative purposes). Multiple ATM streams are received over ATM interface 274, and multiplexed by processor 271 using memory 272 and/or storage devices 273 into a single ATM stream sent out from ATM interface 274. Memory 272 is one type of computer-readable medium, and typically comprises random access memory (RAM), read only memory (ROM), integrated circuits, and/or other memory components. Memory 272 typically stores computer-executable instructions to be executed by processor 271 and/or data which is manipulated by processor 271 for implementing functionality in accordance with the present invention. Storage devices 273 are another type of computer-readable medium, and typically comprise disk drives, diskettes, networked services, tape drives, and other storage devices. Storage devices 273 typically store computer-executable instructions to be executed by processor 271 and/or data which is manipulated by processor 271 for implementing functionality in accordance with the present invention.

As used herein and contemplated by the present invention, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

Figure 3A:
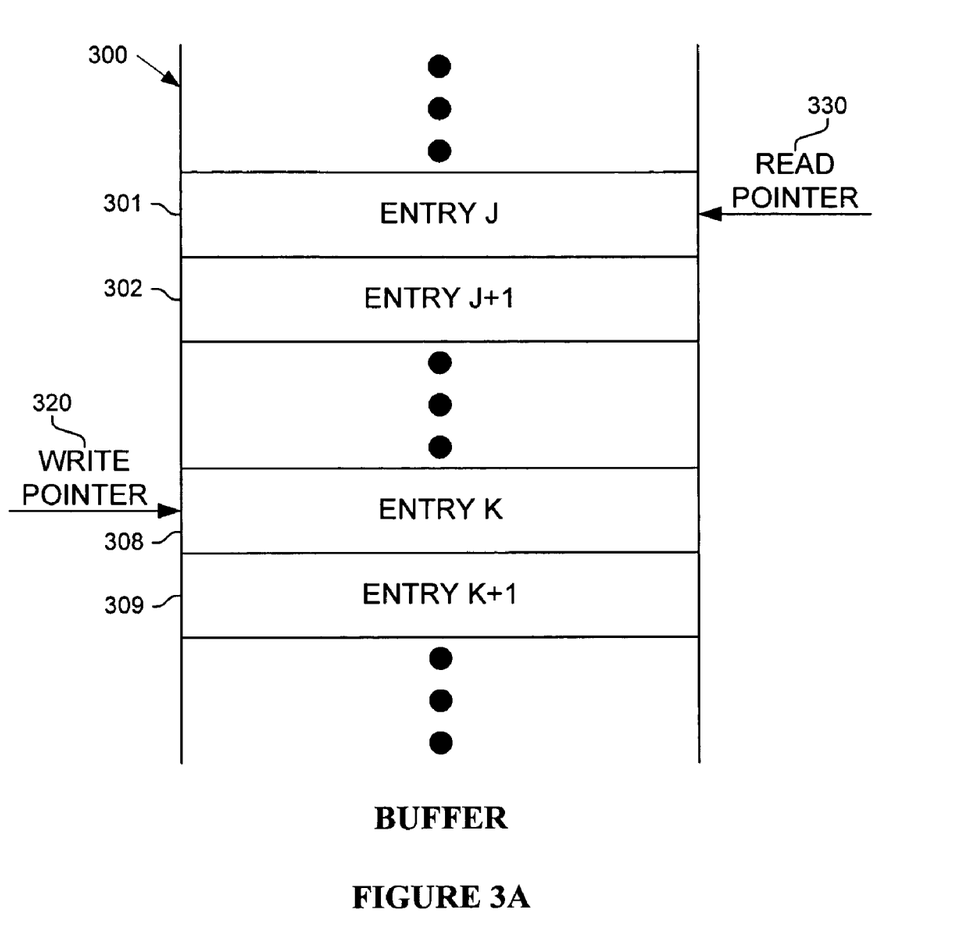
FIG. 3A is a block diagram of a buffer used in one embodiment.

Illustrated in FIG. 3A is one embodiment of a buffer 300 (which corresponds in one embodiment to each of the delay compensation buffers 221-229 shown in FIG. 2A). Typically, buffer 300 is implemented using a ring buffer or some other data structure. Buffer 300 includes multiple entries 301-309, and is typically sized according to link rates and possible variances between link rates. Write pointer 320 is used to indicate a next position within buffer 300 to add a buffer entry. Read pointer 330 is used to indicate a next position within buffer 330 to read a buffer entry.

Figure 3B:
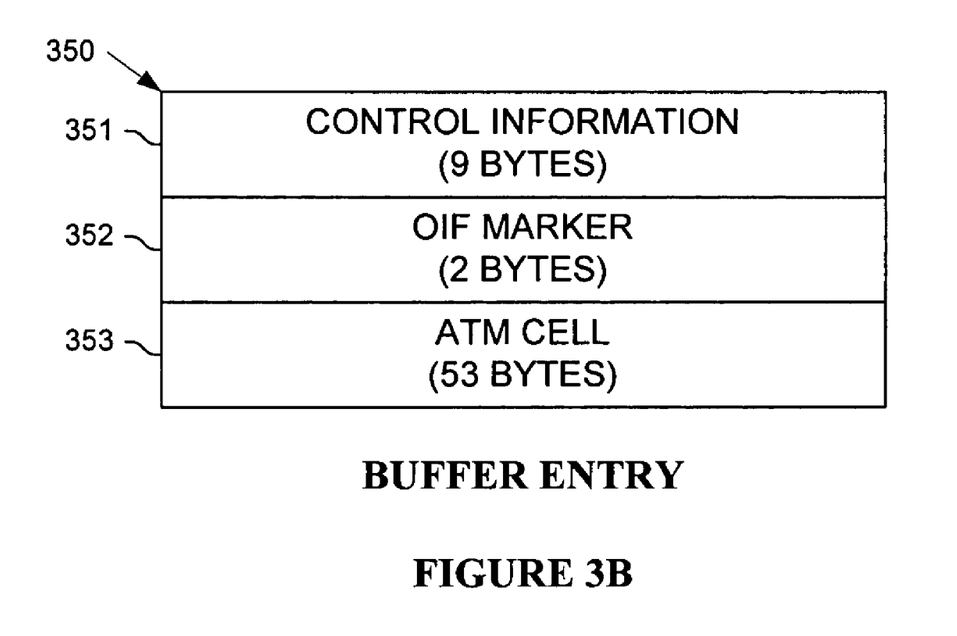
FIG. 3B is a block diagram of a buffer entry format used in one embodiment.

FIG. 3B illustrates one embodiment of a buffer entry 350, including a control information field 351, an OIF marker field 352, and an ATM cell field 353. In one embodiment, if a received ATM cell has a corresponding inactive OIF state, the cell is placed in ATM cell field 353 and an indication (e.g., cleared bit) of the inactive OIF state is placed in OIF marker field 352. If a received ATM cell has a corresponding active OIF state, the ATM cell may or may not be placed in ATM cell field 353 (depending on the embodiment), and an indication (e.g., set bit) of the active OIF condition is placed in OIF marker field 352. In one embodiment, a value (e.g., buffer position or number of entries forward in the buffer, etc.) corresponding to a next position within the buffer of the next buffer entry having a corresponding inactive OIF condition (and thus, the cell stored there may be sent) is placed in OIF marker field 352.

Figure 4:
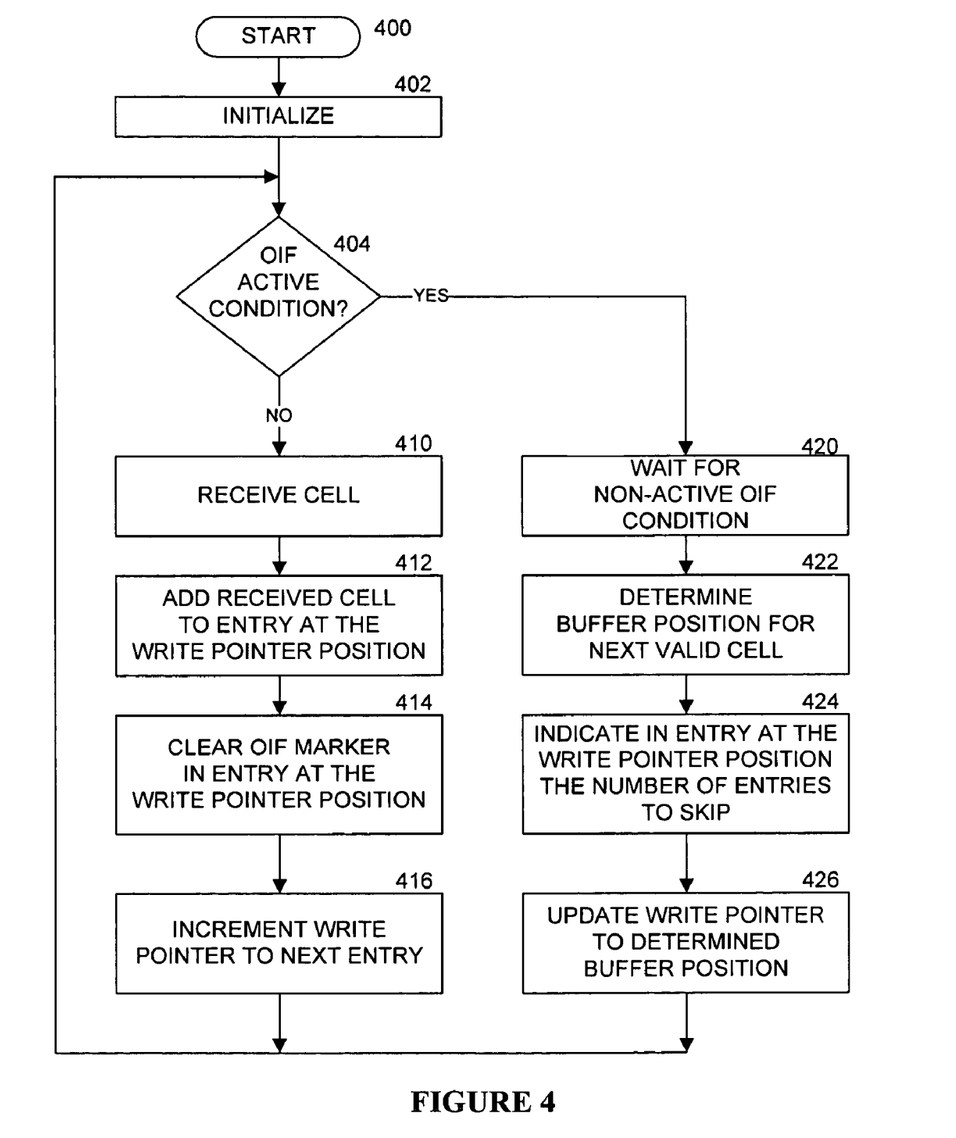
FIG. 4 is a flow diagram illustrating a process performed by a write unit of one embodiment.
Figure 5:
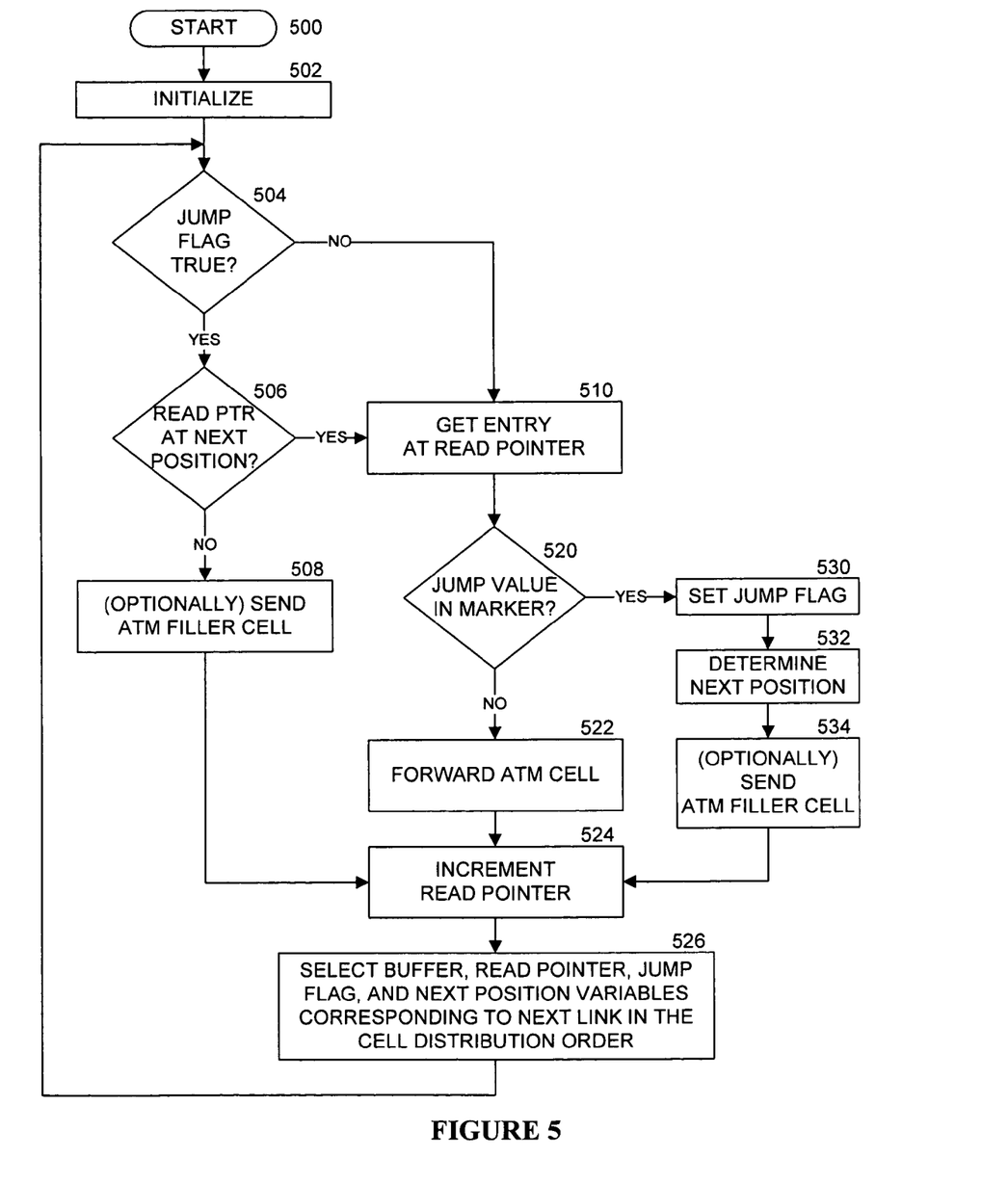
FIG. 5 is a flow diagram illustrating a process performed by a read unit of one embodiment of the invention.

Buffer writing and reading processes of one embodiment are further described by the flow diagrams illustrated in FIGS. 4 and 5, respectively. Processing by the writing process of one embodiment begins at process block 400, and proceeds to process block 402 wherein the writer process is initialized which typically includes, inter alia, initializing a current position (e.g., a writer pointer) within a corresponding buffer. Next, as determined in process block 404, if an indication of an active OIF condition was not received, then a valid cell is received in process block 410, the received cell is added to a buffer entry at the position indicated by the write pointer in process block 412, the OIF marker field is cleared signifying no active OIF condition in process block 414, and the write pointer is incremented to the next buffer position in process block 416. Processing then returns to process block 404.

Otherwise, the write process waits in process block 420 until an indication of a non-active OIF condition is received. Then, in process block 422, the buffer position for the next valid cell is determined based on frame sequence numbers or other indicia, so the next valid cell will be placed in the same buffer position as it would have been if there had never been an active OIF condition so as to not skew or reorder cells received over the multiple links according to a predetermined distribution pattern. The number of buffer entry positions to skip is then placed in the buffer entry at the current write pointer location in process block 424, and the write pointer is updated to the new buffer position for placement of received valid cells in process block 426. Processing then returns to process block 404.

FIG. 5 illustrates one embodiment of a process for reading buffer entries, such as those placed in a buffer by the process illustrated in FIG. 4. Processing of FIG. 5 begins at process block 500, and proceeds to process block 502 wherein the process is initialized for reading each buffer, which typically includes, inter alia, initializing a read pointer within a corresponding buffer, clearing a jump flag, and selecting an initial buffer from which to read a buffer entry. Next, as determined in process block 504, if the jump flag is false, then the next buffer entry at the position indicated by the read pointer is read in process block 510. If there is no jump value in the read entry as determined in process block 520, then the ATM cell is extracted from the buffer entry and sent in process block 522, and processing proceeds to process block 524. Otherwise, there is a jump value in the read entry as determined in process block 520, the jump flag for the current buffer is set in process block 530, the next buffer position is determined in process block 532 by moving forward the number of buffer entries indicated by the jump value, and optionally, a filler or dummy cell is sent in process block 534. Note, different embodiments use other data structures and mechanisms (e.g., additional pointers and/or counters) for determining which buffer entries to skip. Processing then proceeds to process block 524.

Otherwise, as determined in process block 504, the jump flag is true to indicate that cells are to be skipped due to an active OIF condition. If, as determined in process block 506, the current value of the read pointer equals the next position (previously determined in process block 532 in some iteration of the process illustrated in FIG. 5), then all the buffer positions corresponding to an active OIF condition have been skipped and processing proceeds to process block 510 to forward the cell stored in the current buffer position. Otherwise, the contents of the buffer entry are ignored, and optionally, a filler or dummy cell is sent in process block 508. Processing then proceeds to process block 524.

In process block 524, the read pointer is incremented to the sequentially next buffer entry location. Even though the buffer entry at this next position may be known to not contain a cell which may be forwarded, each buffer entry location is sequenced through as to act as a count or throttle so as to provide a mechanism to maintain the original sequence of cells received. To maintain the order of packets within the original stream of cells in one embodiment, cells received on another link may need to be forwarded (e.g., sent) prior to the next cell in a particular buffer (e.g., received on another link) which will actually be sent (e.g., received during an inactive OIF state). In process block 526, the next buffer, its associated read pointer and jump flag variables are selected for use based on the distribution pattern of the original stream of cells, and processing returns to process block 504.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus comprising:
   means for receiving a cell and an Out of Inverse Multiplexing for Asynchronous Transfer Mode Frame anomaly (OIF) indication corresponding to a frame of the cell;
   means for storing the cell and a value corresponding to the received OIF indication in a buffer;
   means for reading the cell and the value from the buffer; and
   means for determining whether the value corresponds to an active OIF state, and either forwarding the cell if the value does not correspond to the active OIF state or not forwarding the cell if the value corresponds to the active OIF state.

2. An apparatus comprising:
   means for receiving a plurality of cells and a plurality of Out of Inverse Multiplexing for Asynchronous Transfer Mode Frame anomaly (OIF) indications over a plurality of links; and
   means for performing for each cell of the received cells: storing in one or more buffers the cell and a corresponding indication of an active or inactive OIF state identified with the cell from the plurality of OIF indications, retrieving from the one or more buffers said cell and the corresponding active or inactive OIF state indication, forwarding said cell if the corresponding active or inactive state indication corresponds to the inactive OIF state, and not forwarding said selected cell if the corresponding active or inactive state indication corresponds to the active OIF state.

3. An apparatus comprising:
means for receiving a first cell and a first Out of Inverse Multiplexing for Asynchronous Transfer Mode Frame anomaly (OIF) indication;
means for determining that the first OIF indication identifies an inactive OIF condition;
means for storing the first cell buffer in the buffer;
means for maintaining a read position;
means for reading the first buffer entry at the read position;
means for extracting the first cell from the first buffer entry read from the buffer;
means for send the extracted first cell;
means for updating the read position to indicate a next position within the buffer;
means for receiving a second OIF indication;
means for determining that the second OIF indication identifies an active OIF condition;
means for determining a new position within the buffer corresponding to a starting location for a next valid cell;
means for storing a second buffer entry at the next position within the buffer including an indication of the determined new position;
means for reading the second buffer entry; and
means for updating the read position based on the indication of the determined new position read from the buffer.

4. The apparatus of claim 3, wherein the indication of the determined new position includes a number of buffer entries to skip.

5. The method of claim 3, wherein the indication of the determined new position includes a buffer address position.

6. An apparatus comprising:
a write unit configured to receive a plurality of cells belonging to a cell stream over a plurality of links and to identify whether each of the plurality of links is in an Out of Inverse Multiplexing for Asynchronous Transfer Mode Frame anomaly (OIF) condition;
one or more buffers, each of said one or more buffers configured to store a set of cells of the plurality of cells received over the plurality of links, and each of said one or more buffers also configured to store an OIF indication to identify one or more positions within said each buffer to skip due to one of the identified OIF anomaly conditions; and
a read unit configured to read at least a subset of the stored sets of cells and the OIF indications from said one or more buffers and to forward the read cells not within the buffer positions identified by said OIF indications to regenerate the cell stream minus cells received on a particular link of the plurality of links during one of the identified OIF conditions for the particular link.

7. The apparatus of claim 6, wherein each of the OIF indications includes a number of buffer positions to skip from a current buffer position.

8. The apparatus of claim 6, wherein the read unit sends a filler cell for each of said buffer positions indicated by each of the OIF indications.

9. The apparatus of claim 6, wherein the read unit maintains a read pointer and a jump flag for each of said one or more buffers.

10. A method comprising:
receiving a first cell and storing the first cell in a buffer at a first position;
identifying an active Out of Inverse Multiplexing for Asynchronous Transfer Mode Frame anomaly (OIF) condition;
identifying that the active OIF condition is no longer active;
receiving a second cell; and
after said identifying that the active OIF condition is no longer active, storing the second cell in the buffer at a second position where the cell would have been stored if the active OIF condition had not been identified, and storing in the buffer an indication to skip from the first position to the second position.

11. The method of claim 10, wherein the indication to skip from the first position to the second position includes a number of buffer positions to skip to reach the second position from the first position.

12. One or more computer-readable media containing computer-executable instructions for performing steps, said steps comprising:
receiving a first cell and storing the first cell in a buffer at a first position;
identifying an active Out of Inverse Multiplexing for Asynchronous Transfer Mode Frame anomaly (OIF) condition;
identifying that the active OIF condition is no longer active;
receiving a second cell; and
after said identifying that the active OIF condition is no longer active, storing the second cell in the buffer at a second position where the cell would have been stored if the active OIF condition had not been identified, and storing in the buffer an indication to skip from the first position to the second position.

13. The computer-readable media of claim 12, wherein the indication to skip from the first position to the second position includes a number of buffer positions to skip to reach the second position from the first position.

14. An apparatus comprising:
means for receiving a first cell and storing the first cell in a buffer at a first position;
means for identifying an active Out of Inverse Multiplexing for Asynchronous Transfer Mode Frame anomaly (OIF) condition;
means for identifying that the active OIF condition is no longer active;
means for receiving a second cell; and
means for, after said identifying that the active OIF condition is no longer active, storing the second cell in the buffer at a second position where the cell would have been stored if the active OIF condition had not been identified, and for storing in the buffer an indication to skip from the first position to the second position.

15. The apparatus of claim 14, wherein the indication to skip from the first position to the second position includes a number of buffer positions to skip to reach the second position from the first position.

* * * * *